United States Patent
Atluri et al.

(10) Patent No.: US 10,632,862 B2
(45) Date of Patent: Apr. 28, 2020

(54) ELECTRIC POWER SYSTEM FOR AN AUTONOMOUS VEHICLE

(71) Applicant: GM Global Technology Operations LLC, Detroit, MI (US)

(72) Inventors: Venkata Prasad Atluri, Novi, MI (US); Chandra S. Namuduri, Troy, MI (US); Massimo Osella, Troy, MI (US); Upali P. Mudalige, Oakland Township, MI (US); Nikhil L. Hoskeri, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 145 days.

(21) Appl. No.: 15/883,801

(22) Filed: Jan. 30, 2018

(65) Prior Publication Data

US 2019/0232793 A1    Aug. 1, 2019

(51) Int. Cl.
| | |
|---|---|
| H02J 7/00 | (2006.01) |
| B60L 53/24 | (2019.01) |
| H02J 7/14 | (2006.01) |
| H02J 7/34 | (2006.01) |
| B60L 58/21 | (2019.01) |

(52) U.S. Cl.
CPC .............. *B60L 53/24* (2019.02); *B60L 58/21* (2019.02); *H02J 7/0013* (2013.01); *H02J 7/14* (2013.01); *H02J 7/1423* (2013.01); *H02J 7/34* (2013.01); *H02J 7/342* (2020.01); *B60L 2210/10* (2013.01); *H02J 7/345* (2013.01); *Y10S 903/93* (2013.01)

(58) Field of Classification Search
CPC ...... B60L 53/24; B60L 58/21; B60L 2210/10; H02J 7/0013; H02J 7/345; Y10S 903/93
USPC ......................................... 307/10.6
See application file for complete search history.

(56) References Cited

U.S. PATENT DOCUMENTS

| | | | |
|---|---|---|---|
| 2009/0015199 A1* | 1/2009 | Kitanaka | H02J 7/0029 320/118 |
| 2013/0154360 A1* | 6/2013 | Ito | B60L 58/15 307/9.1 |
| 2013/0154572 A1* | 6/2013 | Ito | B60L 3/0046 320/136 |
| 2014/0306523 A1* | 10/2014 | Namuduri | F02N 11/087 307/10.6 |

(Continued)

*Primary Examiner* — Thienvu V Tran
*Assistant Examiner* — Brian K Baxter
(74) *Attorney, Agent, or Firm* — Quinn IP Law

(57) ABSTRACT

An electric power system includes an energy recovery system that is operable to convert kinetic energy into electric energy at a first voltage. A primary energy storage device is electrically connected to the energy recovery system at the first voltage. A first voltage autonomous driving system load is disposed in a parallel circuit with the energy recovery system and the primary energy storage device. A bi-directional DC-DC converter is electrically connected to the energy recovery system and the primary energy storage device for converting the electric energy between the first voltage and a second voltage. A secondary energy storage device is electrically connected to the bi-directional DC-DC converter at the second voltage. A second voltage autonomous driving system load is disposed in a parallel circuit with the secondary energy storage device.

13 Claims, 1 Drawing Sheet

(56) References Cited

U.S. PATENT DOCUMENTS

| | | | | |
|---|---|---|---|---|
| 2015/0145488 A1* | 5/2015 | Govindaraj | ............ | H02M 3/158 323/271 |
| 2017/0001585 A1* | 1/2017 | Fink | ..................... | B60R 16/033 |

* cited by examiner

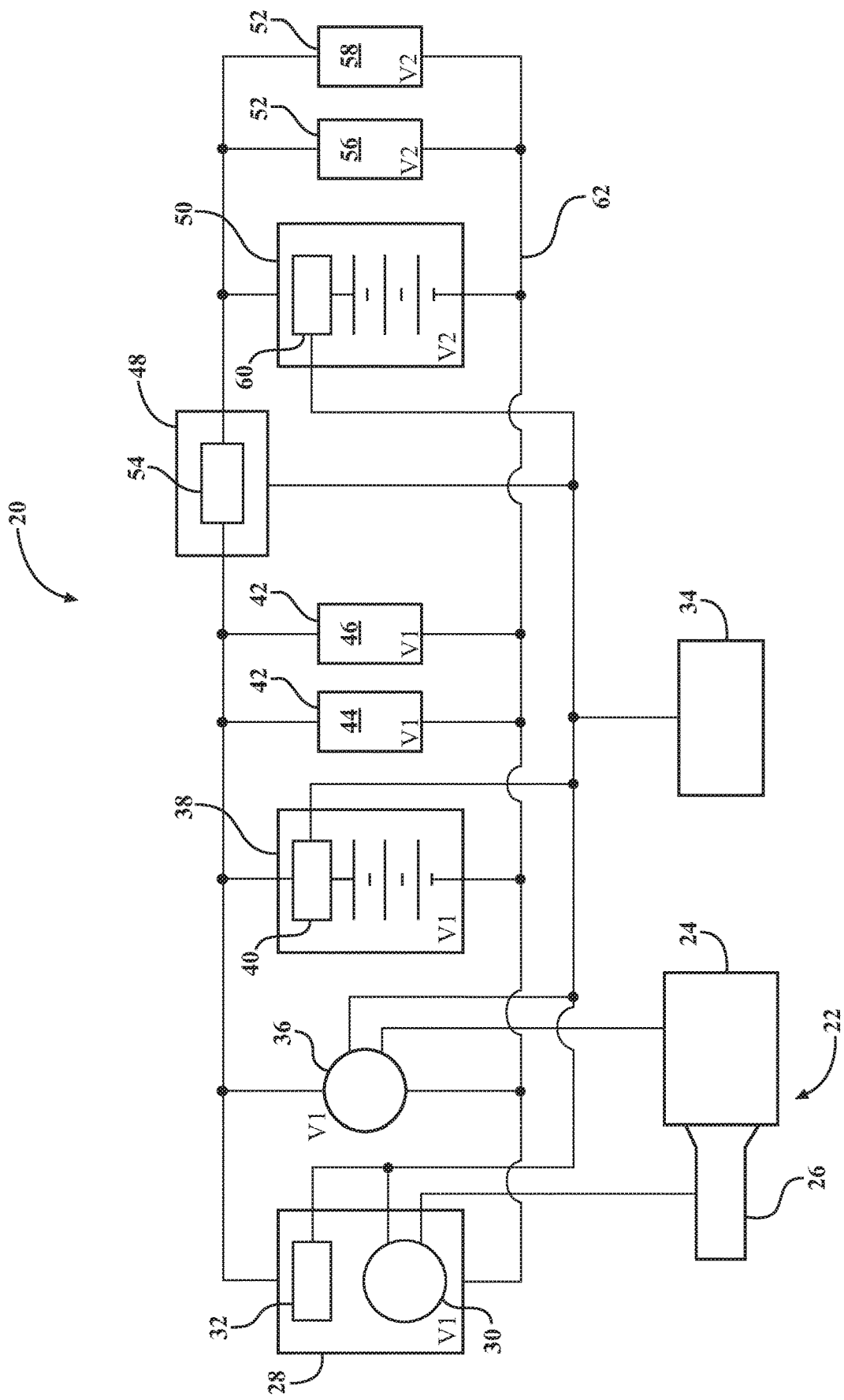

ELECTRIC POWER SYSTEM FOR AN AUTONOMOUS VEHICLE

INTRODUCTION

The disclosure generally relates to an electric power system for an autonomous vehicle.

Some vehicles may be equipped to operate semi or fully autonomously. In order to operate autonomously, vehicles are equipped with many electric energy consuming devices, including but not limited to sensors, actuators, processors, etc. These electric devices consume a large amount of electric energy, which is supplied by an electric power system. In addition to providing the large amounts of electric energy necessary to operate the vehicle autonomously, the electric power system for autonomous vehicles must also be a redundant system to provide continued operation for a period of time in the event of an electrical fault.

SUMMARY

An electric power system is provided. The electric power system includes an energy recovery system that is operable to convert kinetic energy into electric energy at a first voltage. A primary energy storage device is electrically connected to the energy recovery system for receiving and supplying the electric energy at the first voltage. A bi-directional DC-DC converter is electrically connected to the energy recovery system and the primary energy storage device. The bi-directional DC-DC converter is operable to convert the electric energy between the first voltage and a second voltage. A secondary energy storage device is electrically connected to the bi-directional DC-DC converter for receiving and supplying the electric energy at the second voltage. A first voltage load is disposed in a parallel circuit with the energy recovery system and the primary energy storage device. A second voltage load is disposed in a parallel circuit with the secondary energy storage device.

In one embodiment of the electric power system, the first voltage is nominally 48 volts, and the second voltage is nominally 12 volts.

In one aspect of the electric power system, the bi-directional DC-DC converter includes an isolator switch that is operable to isolate the primary energy storage device, the energy recovery system, and the first voltage load from the secondary energy storage device and the second voltage load.

In another aspect of the electric power system, a starter is electrically connected to the primary energy storage device in a parallel circuit. The starter is operable at the first voltage to rotate an engine for starting the engine.

In another aspect of the electric power system, the energy recovery system includes a high efficiency generator that generates electric energy at the first voltage, e.g., 48 volts nominally.

In one aspect of the electric power system, the first voltage load includes a first voltage autonomous system load and a first voltage non-autonomous system load. In another aspect of the electric power system, the second voltage load includes a second voltage autonomous system load and a second voltage non-autonomous system load.

In one aspect of the electric power system, the primary energy storage device includes a primary device isolator switch. The primary device isolator switch is operable to isolate the primary energy storage device in case of an electrical fault. In one embodiment, the primary device isolator switch is normally closed, and opens in response to an electrical fault. In another aspect of the electric power system, the secondary energy storage device includes a secondary device isolator switch that is operable to isolate the secondary energy storage device in case of an electrical fault. In one embodiment, the secondary device isolator switch is normally closed, and opens in response to an electrical fault. In another aspect of the electric power system, the energy recovery system includes a recovery isolator switch that is operable to isolate the energy recovery system in case of an electrical fault. In one embodiment, the recovery isolator switch is normally closed, and opens in response to an electrical fault.

In one aspect of the electric power system, a controller is connected to and operable to control each of the energy recovery system, the recovery isolator switch, the primary energy storage device, the primary device isolator switch, the bi-directional DC-DC converter, the converter isolator switch, the secondary energy storage device, and the secondary device isolator switch. Additionally, the controller may be connected to and operable to control the starter.

In one aspect of the electric power system, an isolated common line interconnects the energy recovery system, the primary energy storage device, the first voltage load, the bi-directional DC-DC converter, the secondary energy storage device, and the second voltage load.

An autonomous vehicle is also provided. The autonomous vehicle includes a powertrain, and an electric power system. The electric power system includes an energy recovery system that is coupled to the powertrain. The energy recovery system is operable to convert kinetic energy from the powertrain into electric energy at a nominal 48 volts. A primary energy storage device is electrically connected to the energy recovery system in a parallel circuit. The primary energy storage device is operable to receive and supply electric energy at nominal 48 volts nominally. A starter is coupled to the powertrain, and is electrically connected to the primary energy storage device in a parallel circuit. The starter is operable in response to electric energy at the nominal 48 volts to rotate the powertrain. A 48 volt autonomous system load is disposed in a parallel circuit with the energy recovery system and the primary energy storage device. The 48 volt autonomous system load supplies electric energy at 48 volts nominally to certain 48 volt components of the autonomous driving system of the vehicle. A bi-directional DC-DC converter is electrically connected to the energy recovery system and the primary energy storage device. The bi-directional DC-DC converter is operable to convert electric energy between the nominal 48 volts and a nominal 12 volts. A secondary energy storage device is electrically connected to the bi-directional DC-DC converter, and is operable to receive and supply electric energy at the nominal 12 volts. A 12 volt autonomous system load is disposed in a parallel circuit with the secondary energy storage device. The 12 volt autonomous system load supplies electric energy at 12 volts nominally to certain 12 volt components of the autonomous driving system of the vehicle. An isolated common line interconnects the energy recovery system, the primary energy storage device, the 48 volt autonomous system load, the bi-directional DC-DC converter, the secondary energy storage device, and the 12 volt autonomous system load.

In one aspect of the autonomous vehicle, the bi-directional DC-DC converter includes an isolator switch operable to isolate the primary energy storage device, the energy recovery system, and the 48 volt autonomous system load from the secondary energy storage device and the 12 volt autonomous system load. In another aspect of the autonomous vehicle, the primary energy storage device includes a primary device isolator switch operable to isolate the primary energy storage device. Additionally, the secondary energy storage device includes a secondary device isolator switch operable to isolate the secondary energy storage device, the energy recovery system includes a recovery isolator switch operable to isolate the energy recovery system.

Accordingly, the energy recovery system, the starter, the primary energy storage device, and some of the autonomous system loads operate at the first voltage, e.g., 48 volts nominally. The power supply system described herein uses kinetic energy, such as from the powertrain of the vehicle, to generate the electric energy at the first voltage, e.g., 48 volts nominally. The electric energy from the energy recovery system may be used to power the autonomous system loads. The bi-directional DC-DC converter converts the electric energy at 48 volts to 12 volts for the secondary energy storage device. The secondary energy storage device may be used to power other autonomous vehicle systems at 12 volts. In the event the primary energy storage device faults, the primary energy storage device may be isolated and the secondary energy storage device may be used to power all of the autonomous vehicle system components, either directly or through the bi-directional DC-DC controller. In the event the secondary energy storage device faults, the secondary energy storage device may be isolated and the primary energy storage device may be used to power all of the autonomous vehicle system components, either directly or through the bi-directional DC-DC controller. Accordingly, the electric power system described herein provides an efficient and redundant electric energy source for powering the autonomous driving systems of the vehicle.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic view of an electric power system for an autonomous vehicle.

DETAILED DESCRIPTION

Those having ordinary skill in the art will recognize that terms such as "above," "below," "upward," "downward," "top," "bottom," etc., are used descriptively for the FIGURES, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to FIG. 1, wherein like numerals indicate like parts, an electric power system is generally shown at 20. The electric power system 20 may be incorporated into a vehicle, such as but not limited to a car, a truck, a van, an SUV, an ATV, train, a plane, or some other moveable platform. For example, the electric power system 20 may be incorporated into a vehicle that is at least partially autonomous, i.e., a vehicle that is capable of at least partial autonomous operation.

The electric power system 20 may be coupled to a powertrain 22, such as a powertrain 22 of a vehicle. The powertrain 22 may include, for example, an engine 24 and a transmission 26. The engine 24 may include, but is not limited to an internal combustion engine 24 that is rotated in order to start firing. The engine 24 produces torque that is transferred to at least one drive wheel through the transmission 26. The specific type, configuration, construction, and operation of the powertrain 22, including the engine 24 and the transmission 26, are not pertinent to the teachings of this disclosure, and are therefore not described in detail herein.

Referring to FIG. 1, the electric power system 20 includes an energy recovery system 28. The energy recovery system 28 is coupled to the powertrain 22, and is operable to convert kinetic energy from the powertrain 22 into electric energy at a first voltage V1. The energy recovery system 28 may be coupled to the powertrain 22 in a manner that enables the energy recovery system 28 to receive kinetic energy from the powertrain 22. The specific manner in which the energy recovery system 28 is coupled to the powertrain 22 is not pertinent to the teachings of this disclosure, is understood by those skilled in the art, and is therefore not described in detail herein. The energy recovery system 28 may include, but is not limited to, a high efficiency generator 30 that operates to generate electric energy at the first voltage V1. As used herein, the term "high efficiency" may be defined as a device that is capable of converting more than 80% of the kinetic energy into electric energy. In one exemplary embodiment, the energy recover system includes a generator 30 capable of generating 10 KW of electric energy at 48 volts, with an efficiency of approximately 90%. In one exemplary embodiment, the first voltage V1 is nominally 48 volts. However, in other embodiments, the first voltage V1 may vary from the nominal 48 volts described in the exemplary embodiment herein.

The energy recovery system 28 includes a recovery isolator switch 32. The recovery isolator switch 32 is operable to isolate the energy recovery system 28 from the electric power system 20 in response to an electrical fault in the energy recovery system 28. The recovery isolator switch 32 is normally closed, so that the energy recover system is connected to the electric power system 20. However, when actuated by a controller 34, the recovery isolate switch may be moved to an open state to disconnect and isolate the energy recovery system 28 from the electric power system 20. The recovery isolator switch 32 may include a mechanical switching device or a solid state switching device capable of separating the energy recovery system 28 from the other components of the electric power system 20. As noted above, the recovery isolator switch 32 is actuated by the controller 34.

A starter 36 is coupled to the powertrain 22. The starter 36 is operable in response to electric energy at the first voltage V1 to rotate the powertrain 22. The starter 36 may include, but is not limited to, an electric motor and Bendix drive for engaging a ring gear on a flywheel of the engine 24 for rotating the engine 24, as is understood by those skilled in the art. As noted above, the starter 36 operates at the first voltage V1. Accordingly, in the exemplary embodiment described herein, the starter 36 operates at 48 volts nominally. The starter 36 is electrically connected to a primary energy storage device 38 in a parallel circuit. Additionally, the starter 36 is electrically connected to the energy recovery system 28 in a parallel circuit.

The primary energy storage device 38 is electrically connected to the energy recovery system 28 for receiving and supplying the electric energy at the first voltage V1. In the exemplary embodiment described herein, the primary energy storage device 38 operates at 48 volts nominally. The primary energy storage device 38 may include a device that is rechargeable and capable of storing electrical energy, such as but not limited to, ultra-capacitors, batteries, battery packs, battery cells, or any combination thereof.

The primary energy storage device 38 includes a primary device isolator switch 40. The primary device isolator switch 40 is operable to isolate the primary energy storage device 38 from the other components of the electric power system 20 in response to an electrical fault in the primary energy storage device 38. The primary device isolator switch 40 is normally closed, so that the primary energy storage device 38 is connected to the electric power system 20. However, when actuated by the controller 34, the primary device isolator switch 40 may be moved to an open state to disconnect and isolate the primary energy storage device 38 from the electric power system 20. The primary device isolator switch 40 may include a mechanical switching device or a solid state switching device capable of separating the primary energy storage device 38 from the other components of the electric power system 20. As noted above, the primary device isolator switch 40 is actuated by the controller 34.

A first voltage load 42 is disposed in a parallel circuit with the energy recovery system 28. The first voltage load 42 is also disposed in a parallel circuit with the primary energy storage device 38. In the exemplary embodiment described herein, the first voltage load 42 may include, but is not limited to, a first voltage autonomous system load 44 and a first voltage non-autonomous system load 46. The first voltage autonomous system load 44 includes the loads associated with operating an autonomous driving system of the vehicle that operate at the first voltage V1, e.g., the exemplary 48 volts described herein. The first voltage autonomous system load 44 may include, but is not limited to, loads from an electric power steering actuator, and electric brake actuator, autonomous driving processors, etc. The first voltage non-autonomous system load 46 includes the loads that are not associated with operation of the autonomous driving system that operate at the first voltage V1, e.g., the exemplary 48 volts described herein. The first voltage non-autonomous system load 46 may include, but is not limited to, loads from an electric heater, an electric turbocharger, lights, etc.

The electric power system 20 further includes a bi-directional DC-DC converter 48. The bi-directional DC-DC converter 48 is electrically connected to the energy recovery system 28, the starter 36, the primary energy storage device 38, the first voltage load 42, a secondary energy storage device 50, and a second voltage load 52. The bi-directional DC-DC converter 48 is operable to convert electric energy between the first voltage V1 and a second voltage V2. In the exemplary embodiment described herein, the second voltage V2 is nominally 12 volts. However, it should be appreciated that the second voltage V2 may differ from the exemplary nominal 12 volts. In the exemplary embodiment described herein, the second voltage V2 is substantially different from the first voltage V1. However, in other embodiments, the second voltage V2 and the first voltage V1 may be substantially similar. In the exemplary embodiment described herein, the bi-directional DC-DC converter 48 is operable to convert electric energy from the secondary energy storage device 50 at the second voltage V2, e.g., 12 volts, to electric energy at the first voltage V1, e.g., 48 volts. Furthermore, the bi-directional DC-DC converter 48 is operable to convert electric energy from the energy recovery system 28 and/or the primary energy storage device 38 at the first voltage V1, e.g., 48 volts, to electric energy at the second voltage V2, e.g., 12 volts. The bi-directional DC-DC converter 48 may include a device that is capable of converting a direct current at the first voltage V1 to a direct current at the second voltage V2 in a first direction, and converting a direct current at the second voltage V2 to a direct current at the first direction in a second direction.

The bi-directional DC-DC converter 48 includes a converter isolator switch 54. The converter isolator switch 54 is operable to isolate the primary energy storage device 38, the energy recovery system 28, the starter 36, and the first voltage load 42 from the secondary energy storage device 50 and the second voltage load 52 in response to an electrical fault in the electric power system 20. The controller 34 controls the operation of the bi-directional DC-DC converter 48, including the converter isolator switch 54 to control current flow between the primary energy storage device 38, the energy recovery system 28, the starter 36, and the first voltage load 42 from the secondary energy storage device 50 and the second voltage load 52. The converter isolator switch 54 may include a mechanical switching device or a solid state switching device capable of separating the primary energy storage device 38, the energy recovery system 28, the starter 36, and the first voltage load 42 from the secondary energy storage device 50 and the second voltage load 52.

The secondary energy storage device 50 is electrically connected to the bi-directional DC-DC converter 48, and is operable to receive and supply electric energy at the second voltage V2. In the exemplary embodiment described herein, the secondary energy storage device 50 operates at 12 volts nominally. However, it should be appreciated that the secondary energy storage device 50 may operate at a voltage that differs from the exemplary nominal 12 volts described herein. The secondary energy storage device 50 may include a device that is rechargeable and capable of storing electrical energy, such as but not limited to, ultra-capacitors, batteries, battery packs, battery cells, or any combination thereof.

The second voltage load 52 is disposed in a parallel circuit with the secondary energy storage device 50. In the exemplary embodiment described herein, the second voltage load 52 may include, but is not limited to, a second voltage autonomous system load 56 and a second voltage non-autonomous system load 58. The second voltage autonomous system load 56 includes the loads associated with operating the autonomous driving system of the vehicle that operate at the second voltage V2, e.g., the exemplary 12 volts described herein. The second voltage autonomous system load 56 may include, but is not limited to, loads from sensors, processors, etc. The second voltage non-autonomous system load 58 includes the loads that are not associated with operation of the autonomous driving system that operate at the second voltage V2, e.g., the exemplary 12 volts described herein. The second voltage non-autonomous system load 58 may include, but is not limited to, loads from a radio, display screen, power windows, interior lights, etc.

The secondary energy storage device 50 includes a secondary device isolator switch 60. The secondary device isolator switch 60 is operable to isolate the secondary energy storage device 50 from the other components of the electric power system 20. The secondary device isolator switch 60 is normally closed, so that the secondary energy storage device 50 is connected to the electric power system 20. However, when actuated by the controller 34, the secondary device isolator switch 60 may be moved to an open state to disconnect and isolate the secondary energy storage device 50 from the electric power system 20 in response to an electrical fault in the secondary energy storage device 50. The secondary device isolator switch 60 may include a mechanical switching device or a solid state switching device capable of separating the secondary energy storage device 50 from the other components of the electric power system 20. As noted above, the secondary device isolator switch 60 is actuated by the controller 34.

The electric power system 20 includes an isolated common line 62. The isolated common line 62 interconnects the energy recovery system 28, the starter 36, the primary energy storage device 38, the first voltage load 42, the bi-directional DC-DC converter 48, the secondary energy storage device 50, and the second voltage load 52. Each of the energy recovery system 28, the starter 36, the primary energy storage device 38, the first voltage load 42, the bi-directional DC-DC converter 48, the secondary energy storage device 50, and the second voltage load 52 my include a respective case ground that is separate from the common line 62.

The controller 34 is connected to and operable to control the energy recovery system 28 including the recovery isolator switch 32 and the generator 30, the starter 36, the primary device isolator switch 40, the bi-directional DC-DC converter 48 including the converter isolator switch 54, and the secondary device isolator switch 60. The controller 34 may alternatively be called a control module, a control unit, a computer, etc. The controller 34 may include a computer and/or processor, and include all software, hardware, memory, algorithms, connections, sensors, etc., for managing and controlling the operation of the electric power system 20. As such a method of controlling the electric power system 20 may be embodied as a program or algorithm operable on the controller 34. It should be appreciated that the controller 34 may include a device capable of analyzing data from various sensors, comparing data, making the decisions required to control the operation of the electric power system 20, and executing the required tasks necessary for controlling the operation of the electric power system 20.

The controller 34 may include an algorithm or program capable of monitoring and diagnosing the electric power system 20. The controller 34 may control the electric power system 20 to isolate one or more faulty components, while maintaining operation of the electric power system 20, thereby providing a redundant system that may be used, for example, to maintain the operation of the autonomous driving system of the vehicle. For example, in the event that the primary energy storage device 38 is identified as faulty, the controller 34 may isolate the primary energy storage device 38 using the primary device isolator switch 40, and control the bi-directional DC-DC converter 48 to convert electric energy at the nominal 12 volts from the secondary energy storage device 50 to electric energy at the nominal 48 volts, in order to power the first voltage loads 42 and/or the starter 36. In the event that the secondary energy storage device 50 is identified as faulty, the controller 34 may isolate the secondary energy storage device 50 using the secondary device isolator switch 60, and control the bi-directional DC-DC converter 48 to convert electric energy at the nominal 48 volts from the primary energy storage device 38 to electric energy at the nominal 12 volts, in order to power the second voltage loads 52.

The detailed description and the drawings or FIGURES are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An electric power system comprising:
    an energy recovery system operable to convert kinetic energy into electric energy at a first voltage, the energy recovery system comprising a recovery isolator switch operable to selectively isolate the energy recovery system;
    a primary energy storage device electrically connected to the energy recovery system for receiving and supplying the electric energy at the first voltage, the primary energy storage device comprising a primary device isolator switch operable to selectively isolate the primary energy storage device;
    a bi-directional DC-DC converter electrically connected to the energy recovery system and the primary energy storage device, and operable to convert the electric energy between the first voltage and a second voltage;
    a secondary energy storage device electrically connected to the bi-directional DC-DC converter for receiving and supplying the electric energy at the second voltage, the secondary energy storage device comprising a secondary device isolator switch operable to selectively isolate the secondary energy storage device;
    a first voltage load disposed in a parallel circuit with the energy recovery system and the primary energy storage device;
    a second voltage load disposed in a parallel circuit with the secondary energy storage device; and
    a computerized controller including programming to:
        monitor operation of the energy recovery system, the primary energy storage device, the secondary energy storage device, the first voltage load, and the second voltage load;
        analyze data from the operation of the energy recovery system, the primary energy storage device, the secondary energy storage device, the first voltage load, and the second voltage load; and
        control operation of the bi-directional DC-DC converter, the recovery isolator switch, the primary isolator switch, and the secondary isolator switch based upon the analyzed data to individually isolate each of the energy recovery system, the primary energy storage device, and the secondary energy storage device.

2. The electric power system set forth in claim 1, wherein the first voltage is nominally 48 volts, and the second voltage is nominally 12 volts.

3. The electric power system set forth in claim 1, wherein the bi-directional DC-DC converter includes an isolator switch operable to isolate the primary energy storage device, the energy recovery system, and the first voltage load from the secondary energy storage device and the second voltage load.

4. The electric power system set forth in claim 1, further comprising a starter electrically connected to the primary energy storage device in a parallel circuit, and operable at the first voltage.

5. The electric power system set forth in claim 1, wherein the energy recovery system includes a high efficiency generator.

6. The electric power system set forth in claim 1, wherein the first voltage load includes a first voltage autonomous system load and a first voltage non-autonomous system load.

7. The electric power system set forth in claim 1, wherein the second voltage load includes a second voltage autonomous system load and a second voltage non-autonomous system load.

8. The electric power system set forth in claim 1, wherein the primary device isolator switch is normally closed.

9. The electric power system set forth in claim 1, wherein the secondary device isolator switch is normally closed.

10. The electric power system set forth in claim 1, wherein the recovery isolator switch is normally closed.

11. The electric power system set forth in claim 1, further comprising an isolated common line interconnecting the energy recovery system, the primary energy storage device, the first voltage load, the bi-directional DC-DC converter, the secondary energy storage device, and the second voltage load.

12. An autonomous vehicle comprising:
 a powertrain;
 an electric power system including:
  an energy recovery system coupled to the powertrain and operable to convert kinetic energy from the powertrain into electric energy at a nominal 48 volts, the energy recovery system comprising a recovery isolator switch operable to selectively isolate the energy recovery system;
  a primary energy storage device electrically connected to the energy recovery system in a parallel circuit and operable to receive and supply electric energy at the nominal 48 volts, the primary energy storage device comprising a primary device isolator switch operable to selectively isolate the primary energy storage device;
  a starter coupled to the powertrain and operable in response to electric energy at the nominal 48 volts to rotate the powertrain;
  a 48 volt autonomous system load disposed in a parallel circuit with the energy recovery system and the primary energy storage device;
  a bi-directional DC-DC converter electrically connected to the energy recovery system and the primary energy storage device, and operable to convert electric energy between the nominal 48 volts and a nominal 12 volts;
  a secondary energy storage device electrically connected to the bi-directional DC-DC converter and operable to receive and supply electric energy at the nominal 12 volts, the secondary energy storage device comprising a secondary device isolator switch operable to selectively isolate the secondary energy storage device;
  a 12 volt autonomous system load disposed in a parallel circuit with the secondary energy storage device;
  an isolated common line interconnecting the energy recovery system, the primary energy storage device, the 48 volt autonomous system load, the bi-directional DC-DC converter, the secondary energy storage device, and the 12 volt autonomous system load; and
  a computerized controller including programming to:
   monitor operation of the energy recovery system, the primary energy storage device, the secondary energy storage device, the first voltage load, and the second voltage load;
   analyze data from the operation of the energy recovery system, the primary energy storage device, the secondary energy storage device, the first voltage load, and the second voltage load; and
   control operation of the bi-directional DC-DC converter, the recovery isolator switch, the primary isolator switch, and the secondary isolator switch based upon the analyzed data to individually isolate each of the energy recovery system, the primary energy storage device, and the secondary energy storage device.

13. The autonomous vehicle set forth in claim 12, wherein the bi-directional DC-DC converter includes an isolator switch operable to isolate the primary energy storage device, the energy recovery system, and the 48 volt autonomous system load from the secondary energy storage device and the 12 volt autonomous system load.

* * * * *